United States Patent Office 3,652,591
Patented Mar. 28, 1972

3,652,591
DIAMIDINE COMPOUNDS
Otto Dann, Bubenreuth, near Erlangen, Germany (% Farbwerke Hoechst AG, Frankfurt am Main, Germany)
No Drawing. Filed May 22, 1968, Ser. No. 731,287
Claims priority, application Germany, May 26, 1967,
P 16 18 288.0
Int. Cl. C07d 27/56
U.S. Cl. 260—326.15                          5 Claims

ABSTRACT OF THE DISCLOSURE

Diamidine compounds having trypanocidal action and corresponding to the general formula

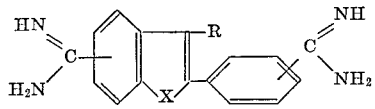

in which R represents hydrogen or lower alkyl, and X represents oxygen, —NH— or —$CH_2$—, and salts of these compounds with inorganic or organic acids.

---

The present invention relates to new diamidine compounds and to a process for preparing them.

More especially, the present invention provides new diamidine compounds of the general Formula I

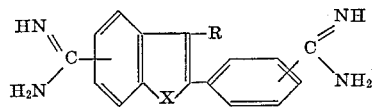

in which R represents hydrogen or lower alkyl, and X represents oxygen, —NH— or —$CH_2$—, and salts of these compounds with inorganic or organic acids.

The present invention also provides a process for preparing the new diamidine compounds, wherein a dicyano compound of the general Formula II

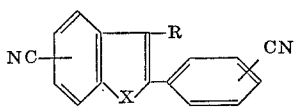

in which R and X have the meanings given above, is converted by means of dry hydrogen halide in an anhydrous solvent in the presence of an alkanol of the general formula Alk.OH, in which Alk represents lower alkyl, into a diimino ether of the general Formula III

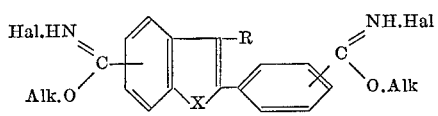

in which R and X have the meanings given above, and in which Alk stands for low molecular weight alkyl and Hal stands for halogen, and the diimino ether is reacted with dry ammonia gas in an anhydrous solvent.

The diamidine compounds prepared according to the invention are distinguished by a strong trypanocidal action against trypanosomes such as Trypanosoma rhodesiense, Trypanosoma gambiense, and Trypanosoma congolense.

The action of the new diamidine compounds against trypanosomes was compared with the action of (carbonyl-bis-{8-[3-(3-amino-benzamido) - 4 - methylbenzamido]-naphthalene-trisulfonic acid-(1,3,5)}) and [4,4'-diamidino-diphenoxypentane - bis - (β - hydroxyethane-sulfonate)] by experiments on infected mice. The results of these experiments are shown in the following Table 1.

A = 5-amidino-2(4'-amidino-phenyl)-indol-dihydrochloride
B = 6-amidino-2-(4'-amidino-phenyl)-indene-dihydrochloride
C = 5-amidino-2-(4'-amidino-phenyl)-benzofurane-dihydrochloride
D = 5-amidino-3-methyl-2-(4'-amidino-phenyl)-benzofurane-dihydrochloride
E = [4,4'-diamidino-diphenoxy-pentane-bis-(β-hydroxyethanesulfonate]
F = (carbonyl-bis-{8-[3-(3-amino-benzamido)-4-methyl-benzamido]-naphthalene-trisulfonic acid-(1,3,5)}).

TABLE 1

| Substance | Mg./kg. | Number of mice treated | Number of surviving mice after 6 weeks |
|---|---|---|---|
| A | 1 (subcutaneously) | 6 | 6 |
|   | 0.5 (subcutaneously) | 6 | 6 |
|   | 0.25 (subcutaneously) | 6 | 4 |
|   | 100 (perorally) | 6 | 6 |
|   | Infection control | 12 | 0 |
| B | 2 (subcutaneously) | 6 | 6 |
|   | 1 (subcutaneously) | 6 | 6 |
|   | 0.5 (subcutaneously) | 6 | 6 |
|   | 64 (perorally) | 6 | 6 |
|   | 16 (perorally) | 6 | 5 |
|   | Infection control | 12 | 0 |
| C | 2 (subcutaneously) | 6 | 6 |
|   | 1 (subcutaneously) | 6 | 6 |
|   | 0.5 (subcutaneously) | 6 | 6 |
|   | 64 (perorally) | 6 | 6 |
|   | 16 (perorally) | 6 | 5 |
|   | Infection control | 12 | 0 |
| D | 1 (subcutaneously) | 16 | 16 |
|   | 0.5 (subcutaneously) | 16 | 16 |
|   | 0.25 (subcutaneously) | 16 | 10 |
|   | 100 (perorally) | 6 | 6 |
|   | 10 (perorally) | 6 | 3 |
|   | Infection control | 32 | 0 |
| E | 2 (subcutaneously) | 6 | 6 |
|   | 1 (subcutaneously) | 6 | 6 |
|   | 0.5 (subcutaneously) | 6 | 2 |
|   | Infection control | 12 | 0 |
| F | 2 (subcutaneously) | 6 | 5 |
|   | 1 (subcutaneously) | 6 | 3 |
|   | Infection control | 12 | 0 |

As results from the above table, the compounds of the present invention have a stronger trypanocidal action than the two known trypanocidal compounds.

The new compounds also show a good action when administered perorally. In contradistinction thereto, the known compounds and the 6-amidino - 2 - (4'-amidino-phenyl)-thionaphthene described in German Patent 1,234,228 show no action when administered perorally.

The action of the compound 6-amidino-2-(4'-amidino-phenyl)-indol-dihydrochloride prepared according to the present invention against the strain Trypanosoma congolense which is pathogenic to animals was compared in experiments with that of the compound 4,4'-diamidino-aminobenzene.

Mice were treated subcutaneously 2 hours after infection by 6-amidino-2-(4'-amidino-phenyl)-indol-dihydrochloride and with 4,4' - diamidino - diazoaminobenzene, respectively. The animals were observed for 9 weeks after the infection. The results are compiled in the following Table 2.

Strain: *Trypanosoma congolense*
Substance A = 6 - amidino-2-(4'-amidino-phenyl)-indol-dihydrochloride
Substance B = 4,4'-diamidino-diazoaminobenzene

TABLE 2

| Substance | Mg./kg., subcutaneously | Number of mice treated | Number of surviving mice after 9 weeks |
|---|---|---|---|
| A | 20 | 10 | 10 |
|   | 9 | 10 | 10 |
|   | 7 | 10 | 10 |
|   | 6 | 10 | 10 |
|   | 4.5 | 10 | 9 |
| B | 10 | 10 | 10 |
|   | 9 | 10 | 7 |
|   | 7 | 10 | 8 |
|   | 6 | 10 | 8 |
|   | 4.5 | 10 | 4 |

The data compiled in the above table show that 6-amidino-2-(4'-amidino-phenyl)-indol-dihydrochloride has a stronger trypanocidal action than 4,4'-diamidino-diazoaminobenzene. The compounds [4,4'-diamidino-diphenoxypentane-bis-(β - hydroxyethanesulfonate)], (carbonyl-bis-{8-[3 - (3 - amino-benzamino)-4-methyl-benzamino]-naphthalene-trisulfonic acid-(1,3,5)}) and the 6-amidino-2-(4'-amidino-phenyl)-thionaphthene described in the German Pat. 1,234,228 practically have no action against *Trpanosoma congolense*.

For therapeutic use, the acid addition salts with non toxic acids, for example with hydrochloric acid, phosphoric acid, acetic acid, tartaric acid, citric acid, succinic acid, lactic acid, maleic acid and isethionic acid, may be used.

The dinitrile compounds required as the starting substances may be obtained according to known methods.

The following examples illustrate the invention but they are not intended to limit it thereto:

EXAMPLE 1

5-amidino-2-(4'-amidino-phenyl)-benzofurane-dihydrochloride

A solution of 2 g. (0.0082 mol) of 5-cyano-2-(4'-cyanophenyl)-benzofurane in 200 ml. of anhydrous chloroform was combined with 10 ml. (0.18 mol) of absolute ethanol. Then, dry HCl gas was introduced for 3 hours into the solution which after saturation with hydrogen chloride was poured into a pressure bottle and shaken for 8 days. The precipitate that had formed was separated by filtration with suction and washed with dry ether and petroleum ether. After drying under reduced pressure over phosphorus pentoxide and potassium hydroxide, 3.3 g. (98.5% of the theoretical yield) of the faintly yellow hydrochloric diimino-ether were obtained.

200 ml. of absolute ethanol were saturated with dry ammonia gas and then combined with the dried diimino-ether. The reaction mixture was shaken for 8 days and the precipitate that formed was filtered off with suction. The yellow salt was dried over phosphorus pentoxide and potassium hydroxide at 20° C. For removing any still adhering hydrogen chloride gas and water, the salt was dried for 24 hours under reduced pressure at 90° C. over phosphorus pentoxide and potassium hydroxide.

2.28 g. (79% of the theoretical yield) of yellow colored 5-amidino - 2 - (4'-amidino-phenyl)-benzofurane-dihydrochloride melting at 355–358° C. (decomposition) were obtained.

The 5 - amidino-2-(4'-amidino-phenyl)benzofurane-diisoethionate was found to melt at 285–289° C. It dissolved at room temperature in water to give a 15% solution.

The 5 - amidino - 2 - (4'-amidino-phenyl)-benzofurane-dilactate was found to melt at 287–289° C. with decomposition. It dissolved at room temperature in water to give a 0.45% solution.

The starting products prepared according to known methods had the following melting points:

|  | ° C. |
|---|---|
| 5-bromo-2-(4'-nitro-phenyl)-benzofurane | 198–200 |
| 5-bromo-2-(4'-amino-phenyl)-benzofurane | 204–205 |
| 5-bromo-2-(4'-bromo-phenyl)-benzofurane | 193–195 |

EXAMPLE 2

6-amidino-2-(4'-amidino-phenyl)-indol-dihydrochloride 10 g. of 6-cyano-2-(4'-cyano-phenyl)-indol were dissolved in 230 ml. of glycol-monomethyl ether by heating. Dry HCl gas was introduced until saturation into the cooled solution with exclusion of moisture, while cooling in a water bath. The HCl-saturated solution was poured into a dry pressure bottle, the stopper was fastened and the bottle was shaken mechanically for 3 days. The suspension that had formed was diluted with 100–150 ml. of methanol and centrifuged for 30 minutes. After decanting of the solvent, the precipitate was stirred several times with anhydrous petroleum ether, decanted again and finally filtered off with suction. The magma-like imino-ether hydrochloride which was still wet from petroleum ether was transferred into a bottle having a capacity of 1 liter, combined with 400 ml. of absolute alcohol saturated with ammonia and shaken mechanically for 7 days. The diamidine that precipitated was filtered off with suction and stirred vigorously for about half an hour in a beaker with about 800 ml. of 2 N HCl. The diamidine-dihydrochloride that formed was again filtered off with suction and dried in a vacuum desiccator at first for 2 days over KOH, then for a further 2–3 days over potassium hydroxide and phosphorus pentoxide, until complete dryness.

Yield: 12 g. (83.5% of the theoretical yield) of yellow 6-amidino-2-(4' - amidino-phenyl)-indol-dihydrochloride melting at 360–362° C. with decomposition.

EXAMPLE 3

6-amidino-2-(4'-amidino-phenyl)-indol-dilactate 250 g. of the ion exchanger "Merck III, strongly basic" were filled into a column having a diameter of about 6 cm. and a length of 35 cm., and saturated with about 800 ml. of 20% ammonium lactate solution.

A solution, prepared at room temperature, of 10 g. of 6-amidino-2-(4'-amidinophenyl)-indol dihydrochloride in about 1 liter of water was passed through this exchange column. The column was washed with about 500 ml. of water until the eluate was colorless. The combined eluates were evaporated to dryness in a rotary evaporator under reduced pressure at 30–40° C. The residue was dried in the flask for 2 to 3 days in a vacuum desiccator over phosphorus pentoxide and triturated to a yellow powder. Yield: 13 g. (100% of the theoretical yield) of yellow dilactate which was found to melt at 219–222° C. The solubility in water at 20° C. was 60%. The aqueous solution showed a neutral reaction.

The diacetate had a melting point of 250–253° C. (decomposition). The solubility in water at 20° C. was 6.5%. The aqueous solution showed a neutral reaction.

EXAMPLE 4

5-amidino-2-(4'-amidino-phenyl)-indol-dihydrochloride 4 g. of 5-cyano-2-(4'-cyano-phenyl)-indol were dissolved in 250 ml. of nitrobenzene by heating. The solution was cooled in a water bath, whereby the substance precipitated partly. 50 ml. of absolute alcohol were added to the suspension and then dry HCl-gas was introduced until saturation under exclusion of moisture, while cooling in a water bath. The HCl-saturated solution was poured into a pressure bottle and shaken mechanically for 12 days. The imino-ether hydrochloride that separated was filtered off with suction, washed with anhydrous ether and anhydrous petroleum ether until it was largely free from HCl and transferred into a pressure bottle. 200 ml. of absolute alcohol saturated with ammonia were added and the reaction mixture was shaken for 7 days. The diamidine that separated was filtered off with suction and stirred vigorously for about half an hour with 300–400 ml. of 2 N HCl. The diamidine-dihydrochloride that formed was filtered off with suction and dried in a vacuum desiccator for 1–2 days over potassium hydroxide, then for a further 2–3 days over potassium hydroxide and phosphorus pentoxide until complete dryness. 3.1 g. (=54% of the theoretical yield) of 5-amidino-2-(4'-amidino-phenyl)-indol-dihydrochloride melting at 360–364° C. with decomposition were obtained.

EXAMPLE 5

6-amidino-2-(3'-amidino-phenyl)-indol-dihydrochloride 1.45 g. of 6-cyano-2-(3'-cyano-phenyl)-indol were dissolved in 45 ml. of nitrobenzene by heating. The cooled solution was combined with 18 ml. of absolute alcohol and then dry HCl gas was introduced until saturation under exclusion of moisture, while cooling in a water bath. The solution saturated with hydrogen chloride was introduced into a pressure bottle and shaken mechanically for 5 days. The imino-ether hydrochloride that precipitated was filtered off with suction, washed on the filter with anhydrous ether and anhydrous petroleum ether until it was largely free from HCl and poured into a pressure bottle. After addition of 80 ml. of absolute alcohol saturated with ammonia, the whole was shaken mechanically for 7 days. The diamidine that precipitated was filtered off with suction and stirred vigorously for about half an hour with about 150 ml. of 2 N HCl. The diamidine-dihydrochloride that formed was filtered off with suction and dried in a vacuum desiccator for 1–2 days over potassium hydroxide, then for a further 1–2 days over potassium hydroxide and phosphorus pentoxide until complete dryness. 1.1 g. (=53% of the theoretical yield) of 6-amidino-2-(3'-amidino-phenyl)-indol-dihydrochloride melting at 331–333° C. with decomposition was obtained.

EXAMPLE 6

5-amidino-2-(3'-amidino-phenyl)-indol-dihydrochloride 1.7 g. of 5-cyano-2-(3'-cyano-phenyl)indol were dissolved in 90 ml. of nitrobenzene while heating. The solution was cooled on a water bath, whereby the substance precipitated partly. The suspension was combined with 22 ml. of absolute alcohol and then dry HCl gas was introduced until saturation under exclusion of moisture, while cooling in a water bath. The HCl-saturated solution was poured into a pressure bottle and shaken mechanically for 7 days. The imino-ether hydrochloride that precipitated was filtered off with suction, washed with anhydrous ether and anhydrous petroleum ether until it was largely free from HCl and transferred into a dry pressure bottle. Then, 100 ml. of absolute alcohol saturated with amonia were added and the whole was shaken mechanically for 7 days. The diamidine that precipitated was filtered off with suction and stirred vigorously for about half an hour with 150–200 ml. of 2 N HCl. The diamidine-dihydrochloride that formed was filtered off with suction and dried in a vacuum desiccator for 1–2 days over potassium hydroxide, then for a further 2–3 days over potassium hydroxide and phosphorus pentoxide until complete dryness.

1.5 g. (61% of the theoretical yield) of 5-amidino-2-(3' - amidino-phenyl)-indol-dihydrochloride, melting at 290–298° C. with decomposition, were obtained.

The starting products prepared according to known methods had the following melting points:

| | ° C. |
|---|---|
| 6-bromo-2-(4'-bromo-phenyl)-indol | 193–194 |
| 5-bromo-2-(4'-bromo-phenyl)-indol | 204–206 |
| 6-bromo-2-(3'-bromo-phenyl)-indol | 123–125 |
| 5-bromo-2(3'-bromo-phenyl)-indol | 147–148 |
| 6-cyano-2-(4'-cyano-phenyl)-indol | 283–284 |
| 5-cyano-2-(4'-cyano-phenyl)-indol | 309–310 |
| 6-cyano-2-(3'-cyano-phenyl)-indol | 230–232 |
| 5-cyano-2-(3'-cyano-phenyl)-indol | 256–258 |

EXAMPLE 7

6-amidino-2-(4'-amidino-phenyl)-indene-dihydrochloride

Dry hydrogen chloride gas was introduced until saturation into a solution of 4.5 g. (19 mmols) of 6-cyano-2-(4'-cyano-phenyl)-indene, melting at 239–241° C., in 250 ml. of anhydrous chloroform and 250 ml. of ethanol. The solution was then poured into a pressure bottle and stirred mechanically for 12 days. The precipitate was washed twice with anhydrous ether and twice with petroleum ether.

The diimino-ether-dihydrochloride was immediately combined in a pressure bottle with 300 ml. of absolute ethanol saturated with ammonia and the air in the bottle was replaced by nitrogen. The bottle was shaken mechanically for one week. The precipitate that separated was filtered off, made into a paste with 250 ml. of 2 N hydrochloric acid, again filtered off and washed with binormal hydrochloric acid. The still wet diamidine-dihydrochloride was dissolved in about 250 ml. of water while stirring. The slightly turbid solution was filtered and the diamidine-dihydrochloride was precipitated from the clear solution by adding 250 ml. of 2 N hydrochloric acid while stirring. The yellow product that precipitated was filtered off and dried under reduced pressure for 48 hours over potassium hydroxide. 4.5 g. (68% of the theoretical yield) of 6-amidino-2-(4'-amidino-phenyl)-indene-dihydrochloride which, upon heating, turned dark from about 250° C. on and which carbonized while melting when heated to 360° C., were obtained.

EXAMPLE 10

In a manner analogous to that described in Example 7, 3 - methyl - 6 - amidino - 2 - (4'-amidinophenyl)-indene-dihydrochloride was obtained in a yield of 70% from 3 - methyl - 6 - cyano - 2 - (4'-cyano-phenyl)-indene (melting point 226–228° C.). The 3 - methyl - 6-amidino-2 - (4' - amidino-phenyl)-indene-dihydrochloride had a yellow color and, when heated, it turned dark from about 250° C. on and carbonized with melting when heated to 360° C.

EXAMPLE 11

In a manner analogous to that described in Example 7, 3 - ethyl - 6 - amidino - 2 - (4'-amidinophenyl)-indene hydrochloride was obtained in a 40% yield from 3-ethyl-6-cyano-2-(4'-cyanophenyl)-indene (M.P. 188–191° C.). The 3 - ethyl - 6 - amidino - 2 - (4'-amidino-phenyl)-indene-dihydrochloride had a yellow color when heated, it turned dark from about 250° C. on and carbonized with melting when heated to 360° C.

EXAMPLE 12

In a manner analogous to that described in Example 7, 3 - n - propyl - 6 - amidino - 2 - (4'-amidino-phenyl)-indene-dihydrochloride was prepared in a yield of 65%. 3 - N-propyl - 6 - cyano - 2 - (4'-cyanophenyl)-indene (M.P. 155–157° C.). The 3 - n-propyl-6-amidino-2-(4'-amidino-phenyl)-indene-dihydrochloride had a yellow color and, when heated, it turned dark from about 250° C. on and melted at about 345° C. The starting substances required for preparing the above compounds were obtained according to known methods.

I claim:

1. A diamidine compound of the formula

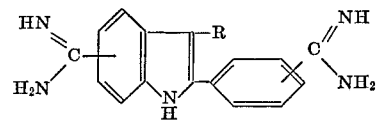

wherein R is hydrogen or lower alkyl, and pharmaceutically acceptable acid addition salts thereof.

2. 6 - amidino-2-(4'amidinophenyl)-indole and pharmaceutically acceptable acid addition salts thereof.

3. 5 - amidino-2-(4'-amidinophenyl)-indole and pharmaceutically acceptable acid addition salts thereof.

4. 6 - amidino-2-(3'-amidinophenyl)-indole and pharmaceutically acceptable acid addition salts thereof.

5. 5 - amidino-2-(3'-amidinophenyl)-indole and pharmaceutically acceptable acid addition salts thereof.

References Cited

UNITED STATES PATENTS 3,354,174   11/1967   Bell _____ 260—309.2

OTHER REFERENCES

Sidgwick, Organic Chemistry of Nitrogen (1937), pp. 154–55.

ALEX MAZEL, Primary Examiner

J. A. NARCAVAGE, Assistant Examiner

U.S. Cl. X.R.

260—319.1, 326.13 R, 346.2 R, 564 R, 566 D; 424—274, 285, 326